US012572642B2

(12) United States Patent
Odayarkoil et al.

(10) Patent No.: US 12,572,642 B2
(45) Date of Patent: Mar. 10, 2026

(54) SYSTEMS AND METHODS FOR DETERMINING WHETHER STREAMING DEVICES UNDER AN IDENTICAL USER ACCOUNT ARE CO-LOCATED

(71) Applicant: Netflix, Inc., Los Gatos, CA (US)

(72) Inventors: Baskar Natarajan Odayarkoil, San Jose, CA (US); Karthik Yagna, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 52 days.

(21) Appl. No.: 18/629,899

(22) Filed: Apr. 8, 2024

(65) Prior Publication Data

US 2024/0346397 A1 Oct. 17, 2024

Related U.S. Application Data

(60) Provisional application No. 63/495,944, filed on Apr. 13, 2023.

(51) Int. Cl.
| | |
|---|---|
| *G06F 21/00* | (2013.01) |
| *G06F 7/58* | (2006.01) |
| *G06F 21/44* | (2013.01) |

(52) U.S. Cl.
CPC .............. *G06F 21/44* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 2019/0028761 A1* | 1/2019 | Bigio ..................... | H04L 63/10 |
| 2019/0286804 A1* | 9/2019 | Chacko ................. | G06F 21/606 |
| 2020/0213309 A1* | 7/2020 | Lewis ................. | H04L 63/0876 |

OTHER PUBLICATIONS

International Search Report and Written Opinion for International Application No. PCT/US2024/023865, dated Jul. 23, 2024; 10 pages.

* cited by examiner

*Primary Examiner* — Andrew J Steinle
(74) *Attorney, Agent, or Firm* — Greenberg Traurig, LLP

(57) ABSTRACT

The disclosed computer-implemented methods and systems include determining whether a second streaming device can connect to a digital content system under the same account as a first streaming device based on the respective locations of the first streaming device and the second streaming device. For example, the methods and systems described herein can generate a challenge for both the first streaming device and the second streaming device that causes both devices to exchange specific information and report back. In response to determining that the received responses are correct, the disclosed methods and systems can allow the second streaming device to connect to the digital content system. Various other methods, systems, and computer-readable media are also disclosed.

20 Claims, 6 Drawing Sheets

SYSTEMS AND METHODS FOR DETERMINING WHETHER STREAMING DEVICES UNDER AN IDENTICAL USER ACCOUNT ARE CO-LOCATED

CROSS REFERENCE

This application claims the benefit of U.S. Provisional Application No. 63/495,944, filed on Apr. 13, 2023, the entire content of which is incorporated herein by reference.

BACKGROUND

Streaming media content is an increasingly popular form of entertainment. For instance, example digital content systems can stream selected digital media items (e.g., TV shows, movies, video games) to subscribers' display devices for instant playback. In this way, digital content system subscribers can watch digital content and/or play video games on their televisions, smart phones, tablets, laptops, etc.

In some instances, a subscriber's household may include more than one display device. For example, household members may stream digital media to multiple TVs, smart phones, tablets, laptops, etc. Because of this, a subscriber may not always be aware of which and how many devices are connected to a streaming service under their account. In some cases, this can give rise to bad actors utilizing subscribers' accounts without their knowledge from different locations. This unauthorized use can give rise to network bandwidth waste and other computational waste. For example, unauthorized use can lead to incorrect playback positions in various digital media items, inaccurate media recommendations auto generated by the streaming service, and so forth.

As such, example streaming services may seek to determine whether display devices that are streaming under the same account are co-located. For example, it may be the case that display devices that are located in the same household while streaming under the same account are less likely to be operated by bad actors. Determining whether display devices are co-located, however, can give rise to additional computational waste and privacy issues. For example, some streaming services may utilize various protocols (e.g., simple service discover protocol or SSDP) to determine whether two display devices are co-located. But this approach can be very complex and may lead to potential performance issues. Moreover, other protocols that may be utilized to determine whether display devices are co-located may do so by collecting private information from a user's local area network (LAN).

SUMMARY

As will be described in greater detail below, the present disclosure describes embodiments that determine whether a second streaming device attempting to access a digital content system under the same account as a first streaming device is co-located with the first streaming device.

In one example, a computer-implemented method for determining that two streaming devices are co-located includes detecting that a first streaming device and a second streaming device are both attempting to connect to a digital content system using an identical user account, and determining that the first streaming device and the second streaming device are associated with a single location by causing the first streaming device to send a first token to the second streaming device, causing the second streaming device to send a second token to the first streaming device, and determining, in response to successfully receiving the second token from the first streaming device and the first token from the second streaming device, the first streaming device and the second streaming device are associated with a single subnet.

Additionally, in some examples, detecting that the first streaming device and the second streaming device are both attempting to connect to the digital content system using the identical user account includes receiving, as part of a request by the first streaming device to connect to the digital content system, a first local internet protocol address and a port from which the first streaming device performs second screen device communications from the first streaming device, and receiving, as part of a request by the second streaming device to connect to the digital content system, a second local internet protocol address and a port from which the second streaming device performs second screen device communications from the second streaming device.

Moreover, in some examples, the computer-implemented method can further include generating the first token by generating a first random number and transmitting the first random number and the second local internet protocol address to the first streaming device. Similarly, the computer-implemented method can also include generating a second random number and transmitting the second random number and the first local internet protocol address to the second streaming device.

In some examples, the computer-implemented method further includes causing the first streaming device to send an associate message to the second streaming device and causing the second streaming device to send the second random number to the first streaming device in response to the associate message. Similarly, the computer-implemented method can also include causing the second streaming device to send the associate message to the first streaming device and causing the first streaming device to send the first random number to the second streaming device in response to the associate message.

In one or more examples, the computer-implemented method can further include, in response to determining that the first streaming device and the second streaming device are associated with the single subnet, associating the first streaming device and the second streaming device with a registry of co-located devices. Additionally, the computer-implemented method can also include maintaining the association between the first streaming device and the second streaming device within the registry of co-located devices for a threshold amount of time.

In at least one example, the computer-implemented method can also include determining that the threshold amount of time has lapsed, regenerating the first token and the second token, causing the first streaming device to send the regenerated first token to the second streaming device, causing the second streaming device to send the regenerated second token to the first streaming device, failing to receive at least one of the second token from the first streaming device or the first token from the second streaming device, and adding an association failure between the first streaming device and the second streaming device within the registry of co-located devices.

Furthermore, in at least one example, the computer-implemented method can include detecting a third streaming device's attempt to connect to the digital content system using the identical user account, determining that at least one of the first streaming device or the second streaming device is connected to the digital content system, and determining that the third streaming device and at least one of the first streaming device or the second streaming device are associated with the single location by causing the third streaming device to send a third token to at least one of the first streaming device or the second streaming device, causing at least one of the first streaming device or the second streaming device to send at least one of the first token or the second token to the third streaming device, and determining, in response to successfully receiving the third token from at least one of the first streaming device or the second streaming device and at least one of the first token or the second token from the third streaming device, that at least one of the first streaming device or the second streaming device and the third streaming device are associated with the single subnet.

Some examples described herein include a system with at least one physical processor and physical memory including computer-executable instructions that, when executed by the at least one physical processor, cause the at least one physical process to perform various acts. In at least one example, the computer-executable instructions, when executed by the at least one physical processor, cause the at least one physical processor to perform acts including: detecting that a first streaming device and a second streaming device are both attempting to connect to a digital content system using an identical user account, and determining that the first streaming device and the second streaming device are associated with a single location by causing the first streaming device to send a first token to the second streaming device, causing the second streaming device to send a second token to the first streaming device, and determining, in response to successfully receiving the second token from the first streaming device and the first token from the second streaming device, the first streaming device and the second streaming device are associated with a single subnet.

In some examples, the above-described method is encoded as computer-readable instructions on a computer-readable medium. In one example, the computer-readable instructions, when executed by at least one processor of a computing device, cause the computing device to: detect that a first streaming device and a second streaming device are both attempting to connect to a digital content system using an identical user account, and determine that the first streaming device and the second streaming device are associated with a single location by causing the first streaming device to send a first token to the second streaming device, causing the second streaming device to send a second token to the first streaming device, and determining, in response to successfully receiving the second token from the first streaming device and the first token from the second streaming device, the first streaming device and the second streaming device are associated with a single subnet.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
FIG. 1 is a block diagram of an exemplary digital content system environment in accordance with one or more implementations.
Figure 1:
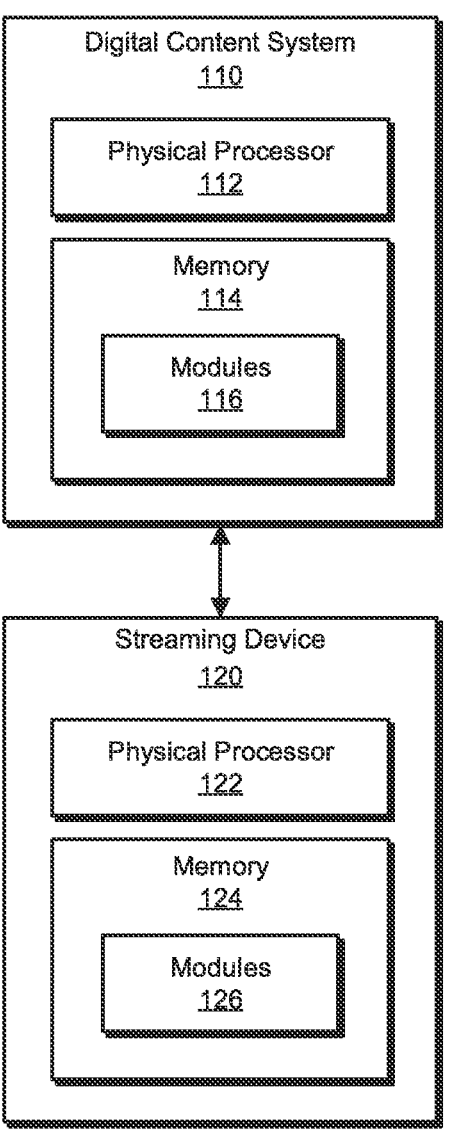

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, it is possible for more than one streaming device to attempt to connect to a digital content system under a single user account. This scenario may arise, for example, when a digital content system subscriber has multiple streaming devices within the same household. It is problematic, however, when streaming devices attempt to connect to a digital content system when they are not reasonably co-located. Existing approaches for determining streaming device locations are undesirable because they can give rise to computational waste and other concerns. To illustrate, some approaches can give rise to various complexities, which in turn can lead to performance issues in connection with the streaming device and the local network (e.g., network bottlenecks, excessive processor cycles, etc.). Other approaches are undesirable because they may access and utilize private user data without the user's knowledge or approval.

To remedy these problems, the present disclosure describes implementations that can determine whether streaming devices attempting to connect to a digital content system under an identical user account are located in a single location without creating performance issues or accessing private user data. For example, the implementations described herein generate a challenge for streaming devices attempting to connect to the digital content system under the same user account that causes the streaming devices to exchange specific information across a single local subnet. The implementations described herein can determine whether the streaming devices are co-located based on how the streaming devices respond to the challenge.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
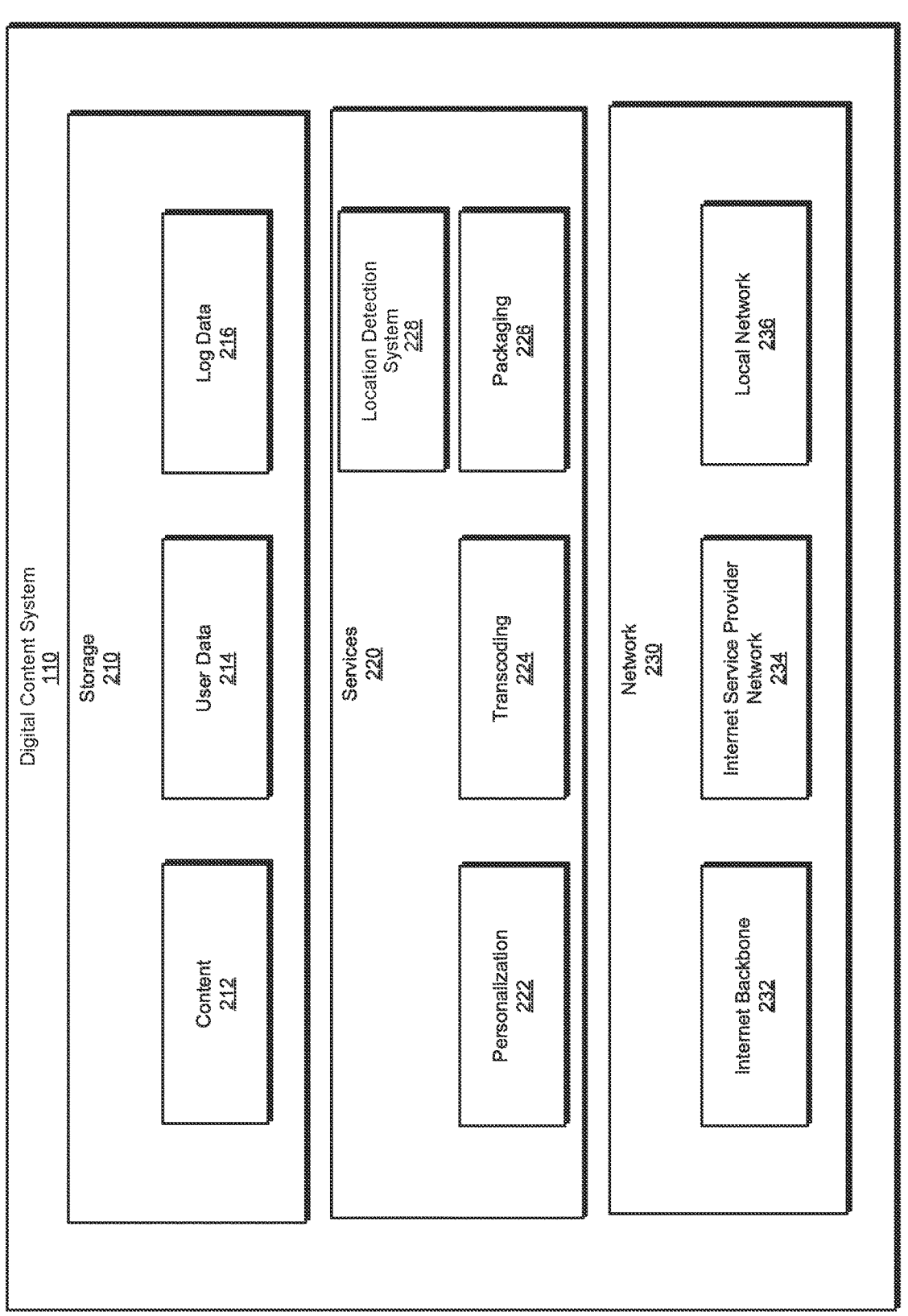
FIG. 2 is a block diagram of an exemplary infrastructure within the digital content system in accordance with one or more implementations.
Figure 3:
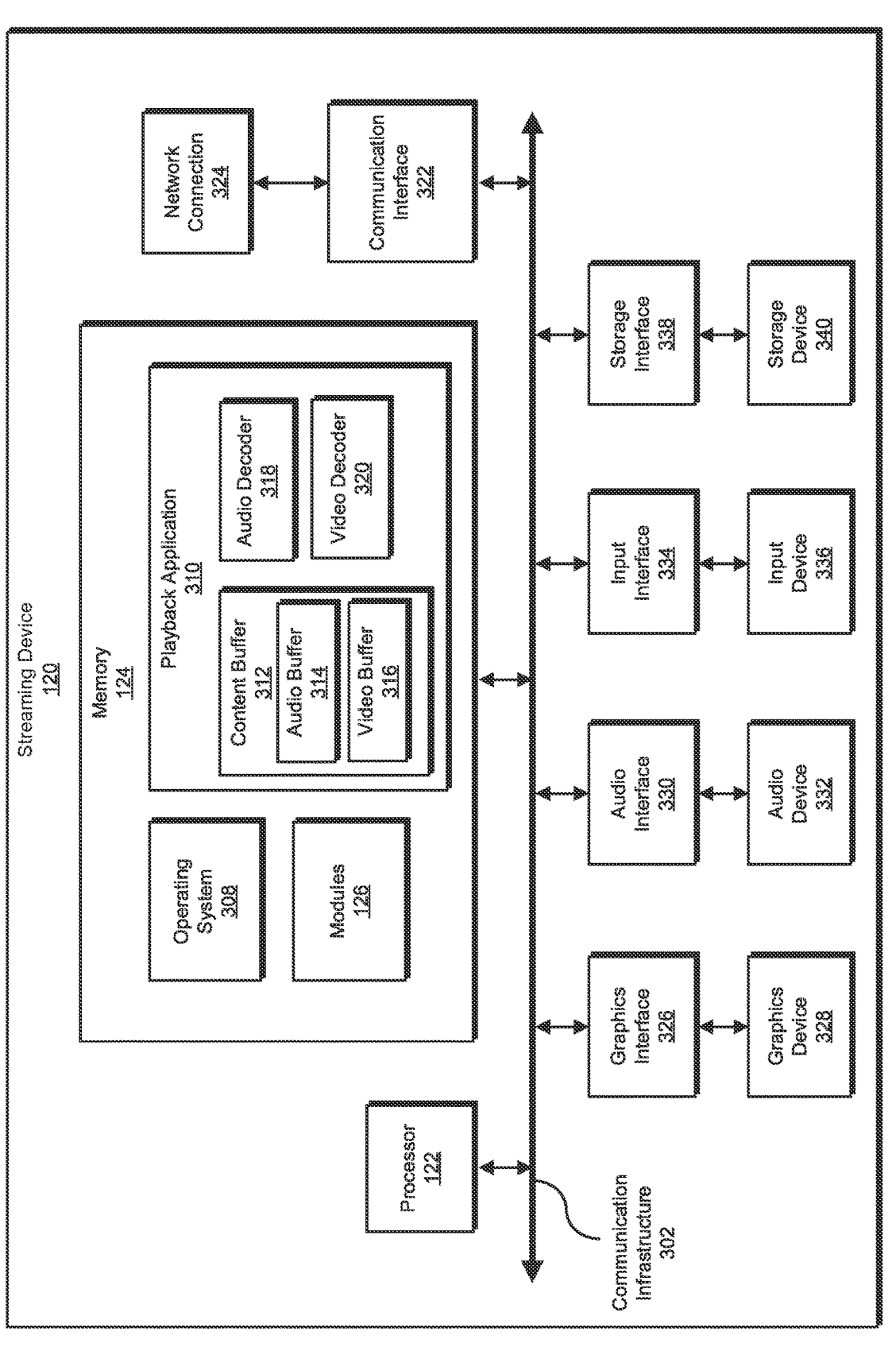
FIG. 3 is a block diagram of an exemplary streaming device within the digital content system environment shown in FIG. 1 in accordance with one or more implementations.

The following will provide, with reference to FIG. 1, detailed descriptions of an exemplary environment in which a digital content system distributes digital content to a streaming device. The discussion corresponding to FIGS. 2 and 3 presents an overview of an exemplary digital content system and an exemplary streaming device used during playback sessions, respectively. Detailed descriptions of corresponding computer-implemented methods for determining whether streaming devices attempting to connect to the digital content system under the same user account are co-located will be provided in connection with FIG. 4. A full sequence of the challenge process is discussed in connection with FIG. 5, and a detailed description of the location detection system is provided in connection with FIG. 6.

FIG. 1 is a block diagram of an environment 100 that includes a digital content system 110 in communication with a streaming device 120. In some embodiments, the digital content system 110 is configured to encode data at a specific data rate and to transfer the encoded data to the streaming device 120. The streaming device 120 is configured to receive the encoded data via the digital content system 110 and to decode the data for playback to a user. The data provided by the digital content system 110 includes, for example, audio, video, text, images, animations, interactive content, haptic data, virtual or augmented reality data, location data, gaming data, or any other type of data that is provided via streaming.

The digital content system 110 generally represents any services, hardware, software, or other infrastructure components configured to deliver content to end users. For example, the digital content system 110 includes content aggregation systems, media transcoding and packaging services, network components, and/or a variety of other types of hardware and software. In some cases, the digital content system 110 is implemented as a highly complex distribution system, a single media server or device, or anything in between. In some examples, regardless of size or complexity, the digital content system 110 includes at least one physical processor 112 and at least one memory 114. As explained below, one or more of the modules 116 are stored or loaded into the memory 114 to enable location detection, as discussed herein.

The streaming device 120 generally represents any type or form of device or system capable of playing audio and/or video content that has been provided over the digital content system 110. Examples of the streaming device 120 include, without limitation, mobile phones, tablets, laptop computers, desktop computers, televisions, set-top boxes, digital media players, virtual reality headsets, augmented reality glasses, and/or any other type or form of device capable of rendering digital content. In some implementations the streaming device 102 may include or be associated with a gaming platform. For example, the streaming device 102 may be a gaming console, a gaming controller, or other gaming device. As with the digital content system 110, the streaming device 120 includes a physical processor 122, memory 124, and one or more modules 126. Some or all of the location detection processes described herein is performed or enabled by the modules 126, and in some examples, the modules 116 of the digital content system 110 coordinate with the modules 126 of the streaming device 120 to perform the location detection processes described herein.

In certain embodiments, one or more of the modules 116 and/or 126 in FIG. 1 represent one or more software applications or programs that, when executed by a computing device, cause the computing device to perform one or more tasks. For example, and as will be described in greater detail below, one or more of the modules 116 and 126 represent modules stored and configured to run on one or more general-purpose computing devices. One or more of the modules 116 and 126 in FIG. 1 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive data from streaming devices, issue challenges, and determine whether streaming devices are co-located based on received challenge responses. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

The physical processors 112 and 122 generally represent any type or form of hardware-implemented processing unit capable of interpreting and/or executing computer-readable instructions. In one example, the physical processors 112 and 122 access and/or modify one or more of the modules 116 and 126, respectively. Additionally or alternatively, the physical processors 112 and 122 execute one or more of the modules 116 and 126 to facilitate the location-detection processes described herein. Examples of the physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

The memory 114 and 124 generally represent any type or form of volatile or non-volatile storage device or medium capable of storing data and/or computer-readable instructions. In one example, the memory 114 and/or 124 stores, loads, and/or maintains one or more of the modules 116 and 126. Examples of the memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of the digital content system 110 according to certain embodiments. The digital content system 110 can include storage 210, services 220, and a network 230. The storage 210 can generally represent any device, set of devices, and/or systems capable of storing content for delivery to end users. The storage 210 may include a central repository with devices capable of storing terabytes or petabytes of data and/or includes distributed storage systems (e.g., appliances that mirror or cache content at Internet interconnect locations to provide faster access to the mirrored content within certain regions). The storage 210 can also be configured in any other suitable manner.

As shown, the storage 210 may store a variety of different items including content 212, user data 214, and/or log data 216. The content 212 can include television shows, movies, video games, user-generated content, and/or any other suitable type or form of content. The user data 214 can include personally identifiable information (PII), payment information, preference settings, language and accessibility settings, and/or any other information associated with a particular user or content player. The log data 216 may include viewing history information, network throughput information, and/or any other metrics associated with a user's connection to or interactions with the digital content system 110.

The services 220 can include personalization services 222, transcoding services 224, packaging services 226, and a location detection system 228. The personalization services 222 can personalize recommendations, content streams, and/or other aspects of a user's experience with the digital content system 110. The transcoding services 224 can compress media at different bitrates that enable real-time switching between different encodings. The packaging services 226 can package encoded video before deploying it to a delivery network, such as the network 230, for streaming.

In one or more implementations, the location detection system 228 can detect two or more streaming devices attempting to connect to the digital content system 110 under a single user account. As discussed above, a single user account can service multiple streaming devices if those streaming devices are co-located. Accordingly, the location detection system 228 can determine whether the streaming devices are co-located by generating a challenge for the streaming devices prior to allowing those devices to connect to the digital content system 110. In at least one implementation, the location detection system 228 can generate a challenge that causes the streaming devices to exchange specific information in a specific order. The location detection system 228 can determine that the streaming devices are co-located based on whether each streaming device responds to the challenge in a predetermined way.

The network 230 can generally represent any medium or architecture capable of facilitating communication or data transfer. The network 230 can facilitate communication or data transfer using wireless and/or wired connections. Examples of the network 230 can include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, the network 230 can include an Internet backbone 232, an internet service provider 234, and/or a local network 236.

FIG. 3 is a block diagram of an exemplary implementation of the streaming device 120 of FIG. 1. The streaming device 120 can generally represent any type or form of computing device capable of reading computer-executable instructions. The streaming device 120 can include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to the processor 122 and the memory 124, the streaming device 120 can include a communication infrastructure 302 and a communication interface 322 coupled to a network connection 324. The streaming device 120 can also include a graphics interface 326 coupled to a graphics device 328, an input interface 334 coupled to an input device 336, and a storage interface 338 coupled to a storage device 340.

The communication infrastructure 302 may generally represent any type or form of infrastructure capable of facilitating communication between one or more components of a computing device. Examples of the communication infrastructure 302 can include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, the memory 124 can generally represent any type or form of volatile or non-volatile storage device or medium capable of storing data and/or other computer-readable instructions. In some examples, the memory 124 can store and/or load an operating system 308 for execution by the processor 122. In one example, the operating system 308 can include and/or represent software that manages computer hardware and software resources and/or provides common services to computer programs and/or applications on the streaming device 120.

The operating system 308 can perform various system management functions, such as managing hardware components (e.g., the graphics interface 326, the audio interface 330, the input interface 334, and/or the storage interface 338). The operating system 308 can also provide process and memory management models for the playback application 310. The modules of the playback application 310 can include, for example, a content buffer 312, an audio decoder 318, and a video decoder 320.

The playback application 310 can be configured to retrieve digital content via the communication interface 322 and play the digital content through the graphics interface 326. The graphics interface 326 can be configured to transmit a rendered video signal to the graphics device 328. In normal operation, the playback application 310 receives a request from a user to play a specific title or specific content. The playback application 310 can then identify one or more encoded video and audio streams associated with the requested title. After the playback application 310 has located the encoded streams associated with the requested title, the playback application 310 can download sequence header indices associated with each encoded stream associated with the requested title from the digital content system 110. A sequence header index associated with encoded content can include information related to the encoded sequence of data included in the encoded content.

In one embodiment, the playback application 310 can begin downloading the content associated with the requested title by downloading sequence data encoded to the lowest audio and/or video playback bitrates to minimize startup time for playback. The requested digital content file may then be downloaded into the content buffer 312, which is configured to serve as a first-in, first-out queue. In one embodiment, each unit of downloaded data includes a unit of video data or a unit of audio data. As units of video data associated with the requested digital content file are downloaded to the streaming device 120, the units of video data can be pushed into the content buffer 312. Similarly, as units of audio data associated with the requested digital content file are downloaded to the streaming device 120, the units of audio data can be pushed into the content buffer 312. In one embodiment, the units of video data are stored in video buffer 316 within the content buffer 312 and the units of audio data are stored in the audio buffer 314 of the content buffer 312.

A video decoder 320 can read units of video data from the video buffer 316 and outputs the units of video data in a sequence of video frames corresponding in duration to the fixed span of playback time. Reading a unit of video data from the video buffer 316 can effectively de-queue the unit of video data from the video buffer 316. The sequence of video frames is then rendered by the graphics interface 326 and transmitted to the graphics device 328 to be displayed to a user.

An audio decoder 318 can read units of audio data from the audio buffer 314 and output the units of audio data as a sequence of audio samples, generally synchronized in time with a sequence of decoded video frames. In one embodiment, the sequence of audio samples is transmitted to the audio interface 330, which converts the sequence of audio samples into an electrical audio signal. The electrical audio signal can then be transmitted to a speaker of the audio device 332, which, in response, generates an acoustic output.

In situations where the bandwidth of the digital content system 110 is limited and/or variable, the playback application 310 can download and buffer consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

The graphics interface 326 is configured to generate frames of video data and transmit the frames of video data to the graphics device 328. In one embodiment, the graphics interface 326 is included as part of an integrated circuit, along with the processor 122. Alternatively, the graphics interface 326 can be configured as a hardware accelerator that is distinct from (i.e., is not integrated within) a chipset that includes the processor 122.

The graphics interface 326 generally represents any type or form of device configured to forward images for display on the graphics device 328. For example, the graphics device 328 can be fabricated using liquid crystal display (LCD) technology, cathode-ray technology, and light-emitting diode (LED) display technology (either organic or inorganic). In some embodiments, the graphics device 328 also includes a virtual reality display and/or an augmented reality display. The graphics device 328 can include any technically feasible means for generating an image for display. In other words, the graphics device 328 generally represents any type or form of device capable of visually displaying information forwarded by the graphics interface 326.

As illustrated in FIG. 3, the streaming device 120 can also include at least one input device 336 coupled to the communication infrastructure 302 via the input interface 334. The input device 336 generally represents any type or form of computing device capable of providing input, either computer or human generated, to the streaming device 120. Examples of the input device 336 can include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

The streaming device 120 can also include a storage device 340 coupled to the communication infrastructure 302 via a storage interface 338. The storage device 340 generally represents any type or form of storage device or medium capable of storing data and/or other computer-readable instructions. For example, the storage device 340 may be a magnetic disk drive, a solid-state drive, an optical disk drive, a flash drive, or the like. The storage interface 338 generally represents any type or form of interface or device for transferring data between the storage device 340 and other components of the streaming device 120.

Many other devices or subsystems can be included in or connected to the streaming device 120. Conversely, one or more of the components and devices illustrated in FIG. 3 need not be present to practice the embodiments described and/or illustrated herein. The devices and subsystems referenced above are also interconnected in different ways from that shown in FIG. 3. The streaming device 120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program can be loaded into the streaming device 120. All or a portion of the computer program stored on the computer-readable medium can then be stored in the memory 124 and/or the storage device 340. When executed by the processor 122, a computer program loaded into the memory 124 causes the processor 122 to perform and/or be a means for performing the functions of one or more of the example embodiments described and/or illustrated herein. Additionally or alternatively, one or more of the example embodiments described and/or illustrated herein are implemented in firmware and/or hardware. For example, the streaming device 120 is configured as an Application Specific Integrated Circuit (ASIC) adapted to implement one or more of the example embodiments disclosed herein.

In one or more implementations, the methods and steps performed by the location detection system 228 reference multiple terms. For example, the term "user account" can refer to a single digital content system subscription. For example, a user can subscribe to the digital content system 110. In response to this subscription, the digital content system 110 can generate a user account that corresponds to the subscription. The user account can include user data, user preferences, a household location, etc. As used herein, a "location" can refer to an area associated with a user account. For example, a location can be a physical address, a geo-fenced area, an internet protocol address (IP address), a specific internet gateway, and so forth.

As used herein, an "internet protocol address" or "IP address" can refer to a specific location within the Internet. For example, the streaming device 120 can be associated with an IP address that allows other computers or servers to locate the streaming device 120. To illustrate, the IP address of the streaming device 120 can be used by the digital content system 110 to stream digital content to the streaming device 120. Similarly, a "local internet protocol address" or "local IP address" can refer to a specific location within a local area network (LAN). In some implementations, streaming devices may have different IP addresses and/or local IP addresses even though they are physically located in the same location.

As used here, a port from which a streaming device performs second screen communications can refer to a logical endpoint of a network connection on the streaming device where a specific type of communication is sent and received. For example, the streaming device may have a port that sends and receives communications that are associated with second screen devices. For example, a second screen device can refer to a device within the same subnetwork as the streaming device. To illustrate, a streaming device may be a TV, while a second screen device within the same subnetwork may be a user's smartphone that is being used as a controller (e.g., a remote control) relative to the TV.

As used herein, a "subnetwork" or "subnet" can refer to part of a larger network. For example, a subnet can include a local network under a single internet router within a household. The router can access the larger network (e.g., the Internet) via a single IP address, while display devices that access the router may have local IP addresses within the subnet created by the router.

As used herein, a "token" can refer to a data package sent from one device to another. For example, the location detection system 228 can generate a token that includes data as well as instructions on how the data is to be used. The location detection system 228 can further transmit the generated token across a network to a given display device based on the display device's IP address.

As used herein, an "associate message" can refer to a message or command sent from one display device to another. For example, an associate message can include instructions that request a recipient display device to provide specific information to the sending display device.

As further used herein, a "registry of co-located devices" can refer to a log of display devices that have been determined to be co-located. For example, a registry of co-located devices can be a repository, database, table, linked list, etc. The registry of co-located devices can include display devices that are associated with each other based on location. As used herein, an "association" can refer to a connection between display devices within the registry of co-located devices. As mentioned above, the association between display devices can indicate that the display devices have proved to the location detection system 228 that they are co-located. Additionally, an "association failure" can refer to a registry entry that indicates two or more display devices that have failed to successfully complete the challenge generated by the location detection system 228. In one or more implementations, display devices that were previously associated within the registry of co-located device may experience an association failure. Moreover, display devices that were not previously included in the registry of co-located device may also experience an association failure.

As used herein, a "threshold amount of time" can refer to a predetermined period of time following an event. For example, the location detection system 228 can re-challenge display devices that are associated within the registry of co-located devices once the threshold amount of time has lapsed. The threshold amount of time can include a number of seconds, minutes, hours, days, weeks, months, etc.

As mentioned above, FIG. 4 is a flow diagram of an exemplary computer-implemented method 400 for determining whether streaming devices attempting to connect to the digital content system 110 under a single user account are co-located. The steps shown in FIG. 4 may be performed by any suitable computer-executable code and/or computing system, including the system(s) illustrated in FIG. 6. In one example, each of the steps shown in FIG. 4 may represent an algorithm whose structure includes and/or is represented by multiple sub-steps, examples of which will be provided in greater detail below.

Figure 4:
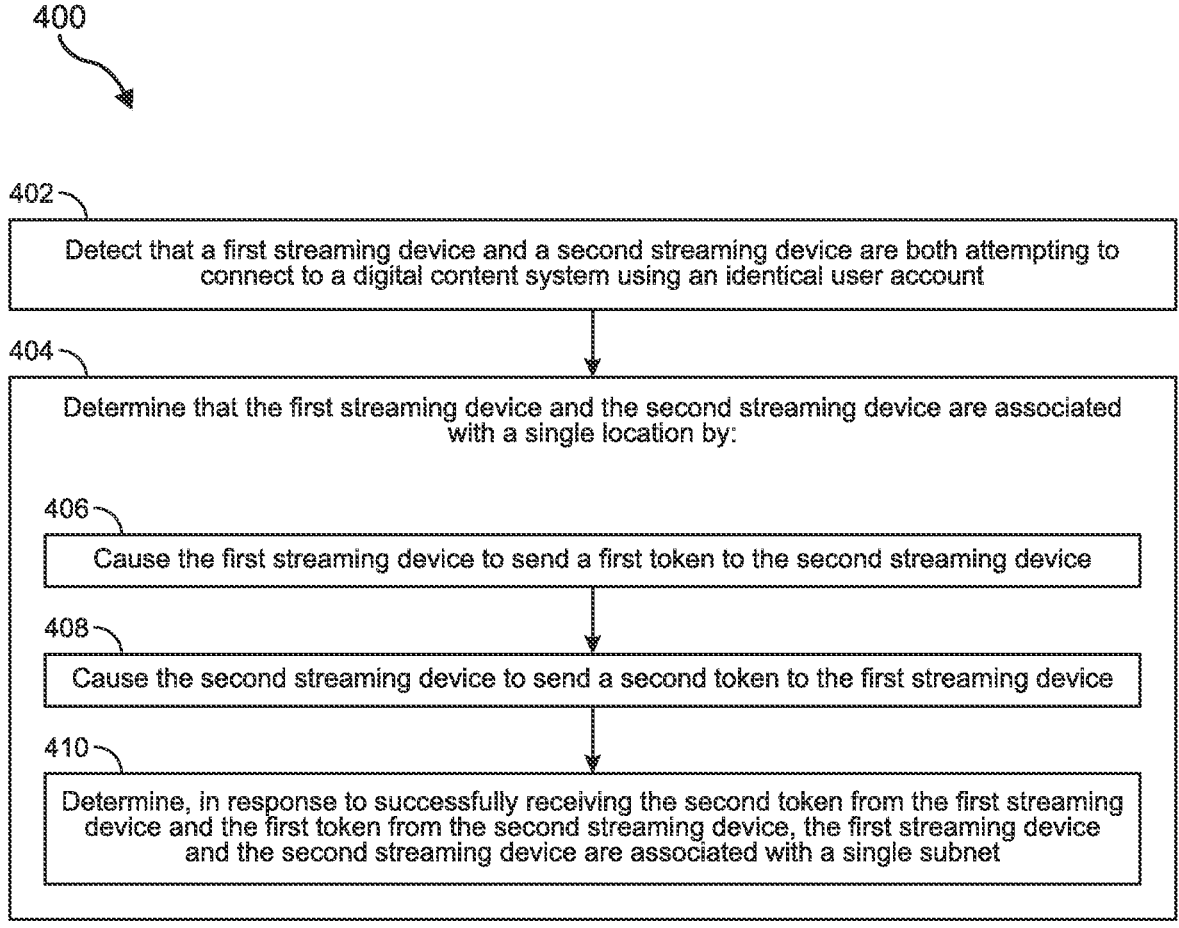
FIG. 4 is a flow diagram of an exemplary computer-implemented method for determining whether streaming devices are co-located in accordance with one or more implementations.

As illustrated in FIG. 4, at step 402 the location detection system 228 can detect that a first streaming device and a second streaming device are both attempting to connect to a digital content system using an identical user account. For example, the location detection system 228 can receive data transmissions from the first streaming device and the second streaming device that indicate the streaming devices are trying to connect to the digital content system under an identical account. To illustrate, the location detection system 228 can detect transmissions including IP addresses associated with both streaming devices, along with other data.

As further illustrated in FIG. 4, at step 404 the location detection system 228 can determine that the first streaming device and the second streaming device are associated with a single location. For example, the location detection system 228 can make this determination by performing steps 406, 408, and 410. In more detail, at step 406 the location detection system 228 can cause the first streaming device to send a first token to the second streaming device. At step 408 the location detection system 228 can further cause the second streaming device to send a second token to the first streaming device. Additionally at step 410 the location detection system 228 can determine, in response to successfully receiving the second token from the first streaming device and the first token from the second streaming device, that the first streaming device and the second streaming device are associated with a single subnet.

In more detail, the location detection system 228 can generate the first and second tokens as part of a challenge by which the first streaming device and second streaming device can prove that they are on the same subnet or are on the same bridged subnets-indicating that they are in the same location. For example, the location detection system 228 can generate the first token including a first random number (A') and an internet protocol address (IP address) for the second streaming device. The location detection system 228 can further generate the second token including a second random number (B') and an IP address for the first streaming device. The location detection system 228 can transmit the first token to the first streaming device and the second token to the second streaming device.

Based on receiving the first and second tokens respectively, the first streaming device and the second streaming device can exchange associate messages. In response to receiving these associate messages, the first and second streaming devices can further exchange their respective random numbers. For example, the first streaming device can send the first random number (A') to the second streaming device and the second streaming device can send the second random number (B') to the first streaming device. Both the first and second streaming devices can further transmit their received random numbers back to the location detection system 228.

In one or more implementations, the location detection system 228 can determine whether the first and second streaming devices are co-located based on the random number received from both. For example, if the location detection system 228 successfully receives the first random number (A') from the second streaming device and the second random number (B') from the first streaming device, the location detection system 228 can determine that the streaming devices are co-located. For example, in at least one implementation, the location detection system 228 can determine that the streaming devices are co-located because the streaming devices were able to send and respond to the associate messages via a specific port across the same subnet with the correct responses (e.g., the first and second random numbers).

Figure 5:
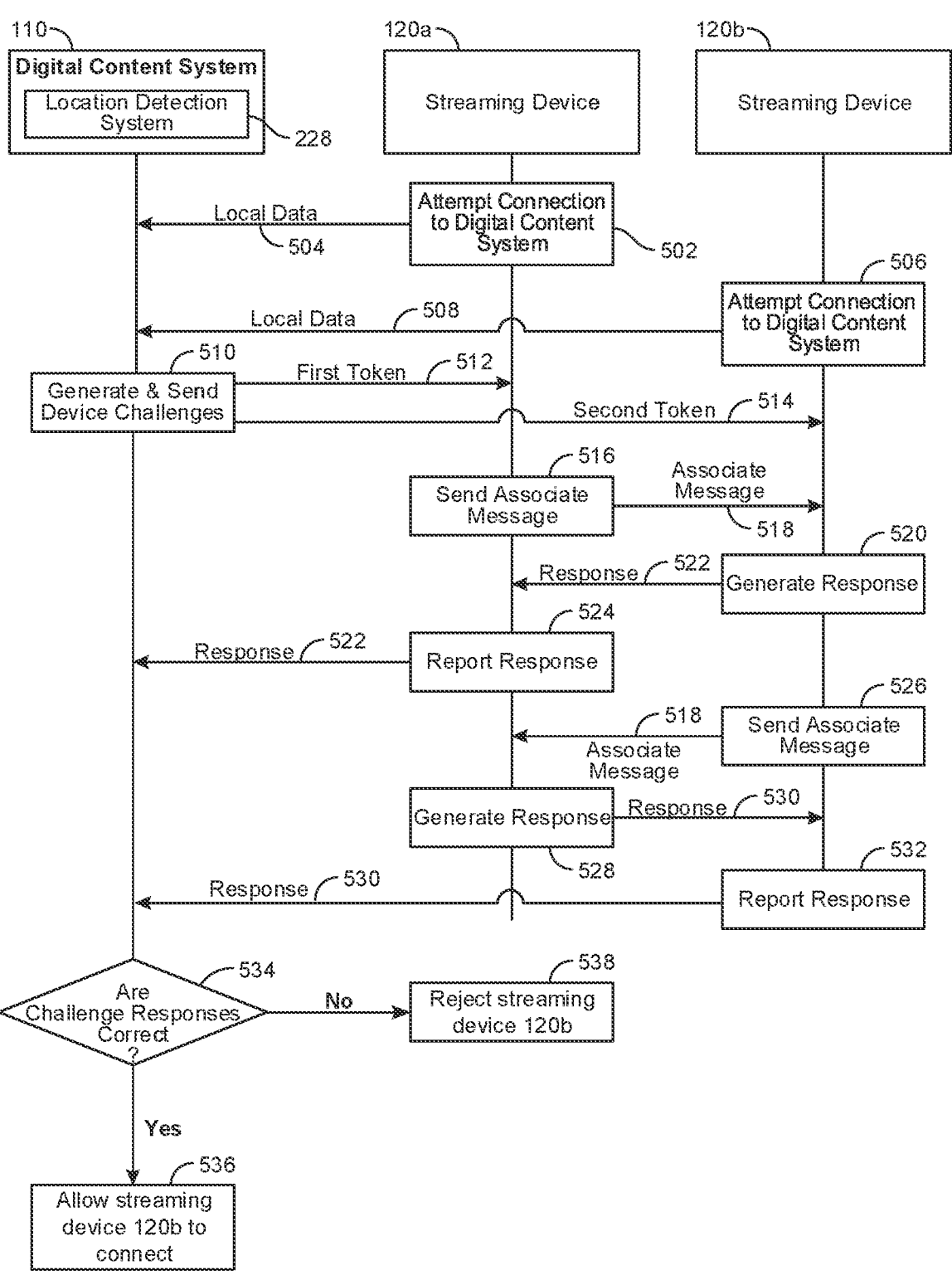
FIG. 5 is a sequence diagram illustrating steps taken by a location detection system in determining whether streaming devices attempting to connect to the digital content system under the same user account are co-located in accordance with one or more implementations.

As mentioned above, the location detection system 228 can generate and send a streaming device challenge to at least two streaming devices that causes those devices to exchange and report certain data in order to prove their location. FIG. 5 includes a sequence diagram demonstrating how the location detection system 228, a first streaming device 120a, and a second streaming device 120b interact with each other during the challenge process. For example, the first streaming device 120a and the second streaming device 120b can attempt to connect to the location detection system 228 in the steps 502 and 506, respectively. In one or more implementations, the location detection system 228 can determine that the first streaming device 120a and the second streaming device 120b are attempting to connect in response to receiving local data 504 from the streaming device 120 and local data 508 from the second streaming device 120b. In at least one implementation, the local data 504 can include a local IP address for the first streaming device 120a, a port from which the first streaming device 120a is communicating (e.g., from which the first streaming device 120a performs second screen communications), and/or a local gateway IP address associated with a local router to which the first streaming device 120a is connected. Optionally, the local data 504 can also include the subnet mask used by the first streaming device 120a. Similarly, the local data 508 can also include a local IP address for the second streaming device 120b, a port from which the second streaming device 120b is communicating (e.g., from which the second streaming device 120b performs second screen communications), a local gateway IP address associated with a local router to which the second streaming device 120b is connected, and/or the subnet mask used by the second streaming device 120b. In some implementations, the local gateway associated with the first streaming device 120a and the local gateway associated with the second streaming device 120b may be identical. In other implementations, these gateways may be different. The first streaming device 120a and the second streaming device 120b may be co-located in either implementation, as the gateway may not indicate whether the devices are in the same location.

In response to receiving the local data 504 and the local data 508 and determining that the first streaming device 120a and the second streaming device 120b are trying to connect, the location detection system 228 can generate and send a challenge to both the first streaming device 120a and the second streaming device 120b at step 510. For example, the location detection system 228 can generate the challenge including a first token 512 that is sent to the first streaming device 120a and a second token 514 that is sent to the second streaming device 120b. In one or more implementations, the location detection system 228 can generate the first token 512 including a first random number and the local IP address of the second streaming device 120b. Similarly, the location detection system 228 can generate the second token 514 including a second random number and the local IP address of the first streaming device 120a.

In one or more implementations, the first token 512 causes the streaming device 120 to perform additional acts upon receipt. For example, following receipt of the first token 512, the first streaming device 120a can send an associate message 518 at step 516. To illustrate, the first token 512 can cause the first streaming device 120a to send the associate message 518 by causing the first streaming device 120a to send a signal to a specific port on the second streaming device 120b.

In response to receiving the associate message 518, the second streaming device 120b can generate a response 522 at step 520. For example, the second streaming device 120b can generate the response 522 including the second random number received as part of the second token 514. The second streaming device 120b can send the second random number to the first streaming device 120a. The first streaming device 120a can further report the response 522 that was received from the second streaming device 120b to the location detection system 228 at step 524. For example, the first streaming device 120a can report the second random number to the location detection system 228.

After generating and sending the response 522, the second token 514 can further cause the second streaming device 120b to send the associate message 518 to the first streaming device 120a at step 526. Moreover, the first streaming device 120a can generate a response 530 at step 528 in response to receiving the associate message 518. For example, the first streaming device 120a can respond to the associate message 518 with the first random number received as part of the first token 512. The second streaming device 120b can further report the response 530 including the first random number to the location detection system 228 at step 532.

At this point the first streaming device 120a and the second streaming device 120b have exchanged information received from the location detection system 228 and reported the exchanged information back to the location detection system 228. The location detection system 228 can then determine at step 534 whether the challenge responses received from the first streaming device 120a and the second streaming device 120b are correct. For example, the location detection system 228 can log the first random number and the second random number when generating the first token 512 and the second token 514. As such, the location detection system 228 can compare the logged first random number to the response 530 from the second streaming device 120b. The location detection system 228 can further compare the logged second random number to the response 522. If the response 530 matches the first random number and the response 522 matches the second random number (e.g., "Yes" in the step 534), the location detection system 228 can allow the streaming device 120b to connect at step 536. In at least one implementation, by correctly responding to the challenge, the first streaming device 120a and the second streaming device 120b have effectively proved to the location detection system 228 that they are on the same subnet—and therefore are co-located. If one or both of the response 530 and the response 522 fail to match the first and second random numbers, respectively, the location detection system 228 can reject the connection attempt from the second streaming device 120b at step 538.

In some embodiments, upon performing the step 536 of allowing the streaming device 120b to connect to the digital content system 110, the location detection system 228 can further add an association between the first streaming device 120a and the second streaming device 120b within a registry of co-located devices. For example, the location detection system 228 can add identifying information associated with the first streaming device 120a and the second streaming device 120b to the registry of co-located devices to indicate that both devices are on the same subnet. As mentioned above, the location detection system 228 may operate under a heuristic that indicates that display devices on the same subnet are co-located.

In one or more implementations, the location detection system 228 can further re-challenge the first streaming device 120a and the second streaming device 120b once their association has been in the registry of co-located devices for a threshold amount of time. For example, to ensure that the second streaming device 120b is still co-located with the first streaming device 120a, the location detection system 228 can re-challenge the first streaming device 120a and the second streaming device 120b in response to determining a predetermined number of hours, days, weeks, etc. have lapsed. In at least one implementation, the location detection system 228 can re-challenge the first streaming device 120a and the second streaming device 120b by regenerating the first and second tokens and following the steps illustrated in FIG. 5.

In one or more embodiments, the location detection system 228 can follow the same steps illustrated in FIG. 5 in response to detecting a third streaming device attempting to connect to the digital content system 110 under the same user account as was used by the first streaming device 120a and the second streaming device 120b. For example, the location detection system 228 can challenge the first streaming device 120a and the third streaming device following the same steps shown in FIG. 5 with the first token and a newly generated third token. In response to determining that the challenge responses from the first streaming device 120a and the third streaming device are correct (e.g., "Yes" in the step 534), the location detection system 228 can add an association between the third streaming device and the first streaming device 120a, or an association between the third streaming device and both the first streaming device 120a and the second streaming device 120b within the registry of co-located devices.

Figure 6:
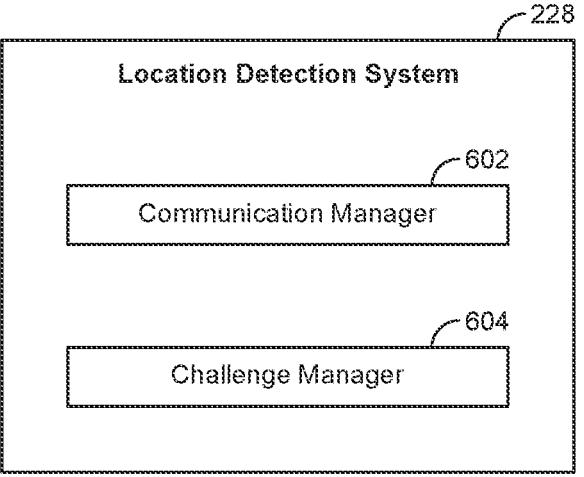
FIG. 6 is a detailed diagram of the location detection system in accordance with one or more implementations.

As mentioned above, the location detection system 228 performs various functions in connection with determining whether first and second streaming devices are on the same subnetwork. FIG. 6 includes a detailed block diagram 600 of the location detection system 228. For example, as shown in FIG. 6, the packaging services 226 can include a communication manager 602 and a challenge manager 604.

In certain implementations, the packaging services 226 may represent one or more software applications or programs that, when executed by a computing device, may cause the computing device to perform one or more tasks. For example, and as will be described in greater detail below, one or more of the communication manager 602 or the challenge manager 604 may represent software stored and configured to run on one or more computing devices. One or more of the communication manager 602 and the challenge manager 604 of the packaging services 226 shown in FIG. 6 may also represent all or portions of one or more special purpose computers to perform one or more tasks.

As mentioned above, and as shown in FIG. 6, the location detection system 228 can include the communication manager 602. In one or more implementations, the communication manager 602 can handle tasks associated with communication between the location detection system 228 and display devices (e.g., the first streaming device 120a and the second streaming device 120b). For example, the communication manager 602 can transmit or cause to be transmitted, data, tokens, associate messages, and responses among the location detection system 228, the first streaming device 120a, and the second streaming device 120b.

As mentioned above, and as further shown in FIG. 6, the location detection system 228 can include the challenge manager 604. In one or more implementations, the challenge manager 604 can generate challenges and determines whether challenge responses are correct. For example, the challenge manager 604 can generate tokens including random numbers and other information (e.g., IP addresses) from display devices trying to connect to the digital content system 110. The challenge manager 604 can further generate tokens including instructions that cause the first streaming device 120a and the second streaming device 120b to communicate with each other according to the steps illustrated in FIG. 5. Upon receipt of responses reported by the first streaming device 120a and the second streaming device 120b, the challenge manager 604 can compare the responses to the data originally included in the first and second tokens. Based on the comparison, the challenge manager 604 can instruct the digital content system 110 to either allow or block the connection request from the second streaming device 120b.

In summary, the location detection system 228 can effectively allow or block a connection request from a second display device under the same user account as a known display device. For example, the location detection system 228 generates and provides a challenge that allows both display devices to prove that they are currently on the same subnet-without accessing any type of user-specific data or engaging in computationally wasteful procedures. Thus, by ensuring that display devices attempting to connect to the digital content system 110 under a single user account are co-located, the location detection system 228 alleviates network bandwidth issues and other computational slowdowns that arise when an unauthorized display device attempts to stream digital content under a user account that is already being used by an authorized display device.

EXAMPLE EMBODIMENTS

Example 1: A computer-implemented method for determining whether a second streaming device is on the same subnetwork as a first streaming device. For example, the method may include detecting that a first streaming device and a second streaming device are both attempting to connect to a digital content system using an identical user account. The method can further include detecting that a first streaming device and a second streaming device are both attempting to connect to a digital content system using an identical user account by causing the first streaming device to send a first token to the second streaming device, causing the second streaming device to send a second token to the first streaming device, and determining, in response to successfully receiving the second token from the first streaming device and the first token from the second streaming device, the first streaming device and the second streaming device are associated with a single subnet.

Example 2: The computer-implemented method of Example 1, wherein detecting that the first streaming device and the second streaming device are both attempting to connect to the digital content system using the identical user account includes receiving, as part of a request by the first streaming device to connect to the digital content system, a first local internet protocol address and a port from which the first streaming device performs second screen communications from the first streaming device and receiving, as part of a request by the second streaming device to connect to the digital content system, a second local internet protocol address and a port from which the second streaming device performs second screen communications from the second streaming device.

Example 3: The computer-implemented method of any of Examples 1 and 2, further including generating the first token by generating a first random number and transmitting the first random number and the second local internet protocol address to the first streaming device.

Example 4: The computer-implemented method of any of Examples 1-3, further including generating the second token by generating a second random number and transmitting the second random number and the first local internet protocol address to the second streamlining device.

Example 5: The computer-implemented method of any of Examples 1-4, further including causing the first streaming device to send an associate message to the second streaming device and causing the second streaming device to send the second random number to the first streaming device in response to the associate message.

Example 6: The computer-implemented method of any of Examples 1-5, further including causing the second streaming device to send the associate message to the first streaming device and causing the first streaming device to send the first random number to the second streaming device in response to the associate message.

Example 7: The computer-implemented method of any of Examples 1-6, further including, in response to determining that the first streaming device and the second streaming device are associated with the single subnet, associating the first streaming device and the second streaming device with a registry of co-located devices.

Example 8: The computer-implemented method of any of Examples 1-7, further including maintaining the association between the first streaming device and the second streaming device within the registry of co-located devices for a threshold amount of time.

Example 9: The computer-implemented method of any of Examples 1-8, further including determining that the threshold amount of time has lapsed, regenerating the first token and the second token, causing the first streaming device to send the regenerated first token to the second streaming device, causing the second streaming device to send the regenerated second token to the first streaming device, failing to receive at least one of the second token from the first streaming device or the first token from the second streaming device, and adding an association failure between the first streaming device and the second streaming device within the registry of co-located devices.

Example 10: The computer-implemented method of any of Examples 1-9, further including detecting a third streaming device's attempt to connect to the digital content system using the identical user account, determining that at least one of the first streaming device or the second streaming device is connected to the digital content system, and determining that the third streaming device and at least one of the first streaming device or the second streaming device are associated with the single location by causing the third streaming device to send a third token to at least one of the first streaming device or the second streaming device, causing at least one of the first streaming device or the second streaming device to send at least one of the first token or the second token to the third streaming device, and determining, in response to successfully receiving the third token from at least one of the first streaming device or the second streaming device and at least one of the first token or the second token from the third streaming device, that at least one of the first streaming device or the second streaming device and the third streaming device are associated with the single subnet.

Example 11: A system may include at least one processor and a physical memory including computer-executable instructions that, when executed by the at least one processor, cause the at least one processor to perform various acts. For example, the computer-executable instructions may cause the at least one processor to perform acts including detecting that a first streaming device and a second streaming device are both attempting to connect to a digital content system using an identical user account and detecting that a first streaming device and a second streaming device are both attempting to connect to a digital content system using an identical user account by causing the first streaming device to send a first token to the second streaming device, causing the second streaming device to send a second token to the first streaming device, and determining, in response to successfully receiving the second token from the first streaming device and the first token from the second streaming device, the first streaming device and the second streaming device are associated with a single subnet.

Example 12: A non-transitory computer-readable medium can include one or more computer-executable instructions that, when executed by at least one processor of a computing device, cause the computing device to perform various acts. For example, the one or more computer-executable instructions may cause the computing device to detect that a first streaming device and a second streaming device are both attempting to connect to a digital content system using an identical user account and detect that a first streaming device and a second streaming device are both attempting to connect to a digital content system using an identical user account by causing the first streaming device to send a first token to the second streaming device, causing the second streaming device to send a second token to the first streaming device, and determining, in response to successfully receiving the second token from the first streaming device and the first token from the second streaming device, the first streaming device and the second streaming device are associated with a single subnet.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:
detecting that a first streaming device and a second streaming device are both attempting to connect to a digital content system using an identical user account; and
determining that the first streaming device and the second streaming device are associated with a single location by:
causing the first streaming device to send a first token to the second streaming device;

causing the second streaming device to send a second token that differs from the first token to the first streaming device; and determining, in response to successfully receiving the second token from the first streaming device and the first token from the second streaming device, that the first streaming device and the second streaming device are associated with a single subnet.

2. The computer-implemented method of claim 1, wherein detecting that the first streaming device and the second streaming device are both attempting to connect to the digital content system using the identical user account comprises:

receiving, as part of a request by the first streaming device to connect to the digital content system, a first local internet protocol address and a port from which the first streaming device performs second screen communications from the first streaming device; and receiving as part of a request by the second streaming device to connect to the digital content system, a second local internet protocol address and a port from which the second streaming device performs second screen communications from the second streaming device.

3. The computer-implemented method of claim 2, further comprising generating the first token by:

generating a first random number; and transmitting the first random number and the second local internet protocol address to the first streaming device.

4. The computer-implemented method of claim 3, further comprising generating the second token by:

generating a second random number; and transmitting the second random number and the first local internet protocol address to the second streaming device.

5. The computer-implemented method of claim 4, further comprising:

causing the first streaming device to send an associate message to the second streaming device; and causing the second streaming device to send the second random number to the first streaming device in response to the associate message.

6. The computer-implemented method of claim 5, further comprising:

causing the second streaming device to send the associate message to the first streaming device; and causing the first streaming device to send the first random number to the second streaming device in response to the associate message.

7. The computer-implemented method of claim 1, further comprising, in response to determining that the first streaming device and the second streaming device are associated with the single subnet, associating the first streaming device and the second streaming device with a registry of co-located devices.

8. The computer-implemented method of claim 7, further comprising maintaining the association between the first streaming device and the second streaming device within the registry of co-located devices for a threshold amount of time.

9. The computer-implemented method of claim 8, further comprising:

determining that the threshold amount of time has lapsed;

regenerating the first token and the second token;

causing the first streaming device to send the regenerated first token to the second streaming device;

causing the second streaming device to send the regenerated second token to the first streaming device;

failing to receive at least one of the second token from the first streaming device or the first token from the second streaming device; and adding an association failure between the first streaming device and the second streaming device within the registry of co-located devices.

10. The computer-implemented method of claim 1, further comprising:

detecting an attempt by a third streaming device to connect to the digital content system using the identical user account;

determining that at least one of the first streaming device or the second streaming device is connected to the digital content system; and determining that the third streaming device and at least one of the first streaming device or the second streaming device are associated with the single location by:

causing the third streaming device to send a third token to at least one of the first streaming device or the second streaming device;

causing at least one of the first streaming device or the second streaming device to send at least one of the first token or the second token to the third streaming device; and determining, in response to successfully receiving the third token from at least one of the first streaming device or the second streaming device and at least one of the first token or the second token from the third streaming device, that at least one of the first streaming device or the second streaming device and the third streaming device are associated with the single subnet.

11. A system comprising:

at least one physical processor; and physical memory comprising computer-executable instructions that, when executed by the at least one physical processor, cause the at least one physical processor to perform acts comprising:

detecting that a first streaming device and a second streaming device are both attempting to connect to a digital content system using an identical user account; and determining that the first streaming device and the second streaming device are associated with a single location by:

causing the first streaming device to send a first token to the second streaming device;

causing the second streaming device to send a second token that differs from the first token to the first streaming device; and determining, in response to successfully receiving the second token from the first streaming device and the first token from the second streaming device, that the first streaming device and the second streaming device are associated with a single subnet.

12. The system of claim 11, wherein detecting that the first streaming device and the second streaming device are both attempting to connect to the digital content system using the identical user account comprises:

receiving, as part of a request by the first streaming device to connect to the digital content system, a first local internet protocol address and a port from which the first streaming device performs second screen communications from the first streaming device; and receiving, as part of a request by the second streaming device to connect to the digital content system, a second local internet protocol address and a port from which the second streaming device performs second screen communications from the second streaming device.

13. The system of claim 12, further comprising computer-executable instructions that, when executed by the at least one physical processor, cause the at least one physical processor to perform acts comprising:

generating the first token by:
  generating a first random number; and
  transmitting the first random number and the second local internet protocol address to the first streaming device; and generating the second token by:
  generating a second random number; and
  transmitting the second random number and the first local internet protocol address to the second streaming device.

14. The system of claim 13, further comprising computer-executable instructions that, when executed by the at least one physical processor, cause the at least one physical processor to perform acts comprising:

causing the first streaming device to send an associate message to the second streaming device; and causing the second streaming device to send the second random number to the first streaming device in response to the associate message.

15. The system of claim 14, further comprising computer-executable instructions that, when executed by the at least one physical processor, cause the at least one physical processor to perform acts comprising:

causing the second streaming device to send the associate message to the first streaming device; and causing the first streaming device to send the first random number to the second streaming device in response to the associate message.

16. The system of claim 11, further comprising computer-executable instructions that, when executed by the at least one physical processor, cause the at least one physical processor to perform an act comprising, in response to determining that the first streaming device and the second streaming device are associated with the single subnet, associating the first streaming device and the second streaming device with a registry of co-located devices.

17. The system of claim 16, further comprising computer-executable instructions that, when executed by the at least one physical processor, cause the at least one physical processor to perform an act comprising maintaining the association between the first streaming device and the second streaming device within the registry of co-located devices for a threshold amount of time.

18. The system of claim 17, further comprising computer-executable instructions that, when executed by the at least one physical processor, cause the at least one physical processor to perform acts comprising:

determining that the threshold amount of time has lapsed;
regenerating the first token and the second token;

causing the first streaming device to send the regenerated first token to the second streaming device;

causing the second streaming device to send the regenerated second token to the first streaming device;

failing to receive at least one of the second token from the first streaming device or the first token from the second streaming device; and adding an association failure between the first streaming device and the second streaming device within the registry of co-located devices.

19. The system of claim 11, further comprising computer-executable instructions that, when executed by the at least one physical processor, cause the at least one physical processor to perform acts comprising:

detecting an attempt by a third streaming device to connect to the digital content system using the identical user account;

determining that at least one of the first streaming device or the second streaming device is connected to the digital content system; and determining that the third streaming device and at least one of the first streaming device or the second streaming device are associated with the single location by:

causing the third streaming device to send a third token to at least one of the first streaming device or the second streaming device;

causing at least one of the first streaming device or the second streaming device to send at least one of the first token or the second token to the third streaming device; and determining, in response to successfully receiving the third token from at least one of the first streaming device or the second streaming device and at least one of the first token or the second token from the third streaming device, that at least one of the first streaming device or the second streaming device and the third streaming device are associated with the single subnet.

20. A non-transitory computer-readable medium comprising one or more computer-executable instructions that, when executed by at least one processor of a computing device, cause the computing device to:

detect that a first streaming device and a second streaming device are both attempting to connect to a digital content system using an identical user account; and determine that the first streaming device and the second streaming device are associated with a single location by:

causing the first streaming device to send a first token to the second streaming device;

causing the second streaming device to send a second token that differs from the first token to the first streaming device; and determining, in response to successfully receiving the second token from the first streaming device and the first token from the second streaming device, that the first streaming device and the second streaming device are associated with a single subnet.

* * * * *